United States Patent
Gerber et al.

(10) Patent No.: US 9,284,999 B2
(45) Date of Patent: Mar. 15, 2016

(54) GUIDE PIN FOR DISC BRAKE ASSEMBLY, DISC BRAKE ASSEMBLY INCLUDING SUCH A GUIDE PIN AND METHOD FOR PRODUCING A DISC BRAKE ASSEMBLY INCLUDING SUCH A GUIDE PIN

(71) Applicants: Kelsey-Hayes Company, Livonia, MI (US); Lucas Automotive GmbH, Koblenz (DE)

(72) Inventors: Kraig Gerber, Plymouth, MI (US); Guido Zenzen, Macken (DE)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 88 days.

(21) Appl. No.: 13/832,100

(22) Filed: Mar. 15, 2013

(65) Prior Publication Data

US 2014/0262636 A1 Sep. 18, 2014

(51) Int. Cl.
*F16D 65/14* (2006.01)
*F16D 55/2265* (2006.01)
*F16D 65/00* (2006.01)
*F16D 55/227* (2006.01)

(52) U.S. Cl.
CPC ........ *F16D 55/22655* (2013.01); *F16D 55/227* (2013.01); *Y10T 29/49826* (2015.01)

(58) Field of Classification Search
CPC .......... F16D 55/2265; F16D 55/22655; F16D 55/227; F16D 2055/0004; F16D 2055/0008; F16D 2055/007; Y10T 29/49826

USPC ......... 188/73.43, 73.44, 73.45, 205 R, 206 R, 188/73.1; 411/386, 403
See application file for complete search history.

(56) References Cited

U.S. PATENT DOCUMENTS

| | | | |
|---|---|---|---|
| 3,722,634 A * | 3/1973 | Ogasawara et al. ........ | 188/73.37 |
| 3,744,367 A * | 7/1973 | Lerich ............................. | 411/75 |
| 4,308,938 A * | 1/1982 | Denton ...................... | 188/73.45 |
| 4,313,526 A * | 2/1982 | Farr ............................ | 188/72.4 |
| 5,526,904 A * | 6/1996 | Walden et al. ............. | 188/73.45 |
| 5,927,446 A | 7/1999 | Evans | |
| 6,039,156 A | 3/2000 | Schneider | |
| 8,051,958 B1 | 11/2011 | Rockwell et al. | |
| 2014/0116817 A1* | 5/2014 | Morais et al. .............. | 188/73.45 |

* cited by examiner

*Primary Examiner* — Melody Burch
(74) *Attorney, Agent, or Firm* — MacMillian, Sobanski & Todd, LLC (57) ABSTRACT

A disc brake assembly having a guide pin disposed in a bore of an anchor bracket such that a guide pin axis is offset relative to a bore axis whereby there is provided at least one defined point of contact between only a portion of the guide pin and a portion of an inner surface of the bore. The guide pin includes at least one slot having a member, which is formed separate from the guide pin, and disposed therein to bias the guide pin in the bore thereby offsetting the guide pin axis relative to the bore axis. The member includes a first member formed from an elastomeric material and a second member formed from a metal material, wherein the second member is configured to retain the member in the slot.

18 Claims, 6 Drawing Sheets

GUIDE PIN FOR DISC BRAKE ASSEMBLY, DISC BRAKE ASSEMBLY INCLUDING SUCH A GUIDE PIN AND METHOD FOR PRODUCING A DISC BRAKE ASSEMBLY INCLUDING SUCH A GUIDE PIN

BACKGROUND OF THE INVENTION

This invention relates in general to vehicle brake assemblies and in particular to an improved structure for a guide pin for a vehicle disc brake assembly, disc brake assembly including such a guide pin and method for producing a disc brake assembly including such a guide pin.

Most vehicles today are equipped with a brake system for retarding or stopping movement of the vehicle in a controlled manner. A typical brake system for an automobile or truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pins of the anchor bracket, the caliper outboard leg (and, thus, the outboard brake shoe disposed adjacent thereto) are urged inwardly toward the outer side of the disc. As result, the brake shoes frictionally engage the opposed sides of the disc.

SUMMARY OF THE INVENTION

This invention relates to an improved structure for a guide pin for a vehicle disc brake assembly, disc brake assembly including such a guide pin and method for producing a disc brake assembly including such a guide pin.

According to one embodiment, the disc brake assembly may comprise, individually and/or in combination, one or more of the following features: an anchor bracket having at least one bore formed therein, the bore defining a first axis; and a guide pin adapted to be disposed in the bore of the anchor bracket and configured to slidably support a brake caliper relative to the anchor bracket, the guide pin defining a second axis; wherein when the guide pin is disposed in the at least one bore of the anchor bracket, the second axis of the guide pin is configured to be offset relative to the first axis of the at least one bore such that there is provided at least one defined point of contact between only a portion of the guide pin and a portion of an inner surface of the at least one bore; wherein the guide pin includes at least one slot, the at least one slot having a member, which is formed separate from the guide pin, disposed therein and which is operative to bias the guide pin in the at least one bore thereby offsetting the second axis of the guide pin relative to the first axis of the at least one bore, wherein the member includes a first member formed from an elastomeric material and a second member formed from a metal material, wherein the second member is configured to retain the member in the slot.

According to this embodiment of the disc brake assembly, the member may be retained in the slot by a press-fit.

According to this embodiment of the disc brake assembly, the slot may be of a closed configuration and defines a first upper slot width at an upper open end thereof which is less than a second lower slot width at a lower closed bottom end thereof.

According to this embodiment of the disc brake assembly, the second member may be at least one metal strip.

According to this embodiment of the disc brake assembly, the metal strip may be a generally flat metal strip.

According to this embodiment of the disc brake assembly, metal strip may be a generally U-shaped metal strip.

According to this embodiment of the disc brake assembly, the metal strip may be a generally bow-shaped metal strip.

According to this embodiment of the disc brake assembly, second member may be a pair of metal strips disposed on opposed sides of the first member.

According to another embodiment, the disc brake assembly may comprise, individually and/or in combination, one or more of the following features: an anchor bracket having at least one bore formed therein, the bore defining a first axis; and a guide pin adapted to be disposed in the bore of the anchor bracket and configured to slidably support a brake caliper relative to the anchor bracket, the guide pin defining a second axis; wherein when the guide pin is disposed in the at least one bore of the anchor bracket, the second axis of the guide pin is configured to be offset relative to the first axis of the at least one bore such that there is provided at least one defined point of contact between only a portion of a shank portion of the guide pin and a portion of an inner surface of the at least one bore; wherein the guide pin includes at least one slot, the at least one slot having a member, which is formed separate from the guide pin, disposed therein and which is operative to bias the guide pin in the at least one bore thereby offsetting the second axis of the guide pin relative to the first axis of the at least one bore, wherein the member includes at least one first member formed from an elastomeric material and at least one second member formed from a metal material, wherein the at least one second member is secured to the at least one first member and the at least one second member is configured to deform to thereby retain the member in the slot.

According to this embodiment, the member may be retained in the slot by a press-fit.

According to this embodiment, the slot may be of a closed configuration and defines a first upper slot width at an upper open end thereof which is less than a second lower slot width at a lower closed bottom end thereof.

According to this embodiment, the at least one second member may be a generally flat metal strip.

According to this embodiment, the at least one second member may be a generally U-shaped metal strip.

According to this embodiment, the at least one second member may be a generally bow-shaped metal strip.

According to this embodiment, the at least one second member may be a pair of metal strips disposed on opposed sides of the first member.

According to another embodiment, a method for producing a disc brake assembly may comprise, individually and/or in combination, one or more of the steps of: (a) providing an anchor bracket having at least one bore formed therein, the bore defining a first axis; (b) providing a guide pin having at least one slot formed therein, the guide pin defining a second axis; (c) disposing a member, which is formed separate from the guide pin, in the slot, the member including a first member formed from an elastomeric material and a second member formed from a metal material; (d) following step (c), disposing the guide pin in the at least one bore of the anchor bracket wherein the member is operative to bias the guide pin in the at least one bore to thereby offset the second axis of the guide pin relative to the first axis of the at least one bore such that there is provided at least one defined point of contact between only a portion of the guide pin and a portion of an inner surface of the at least one bore, and wherein during at least one of the step (c) and the step (d) the second member is configured to deform to thereby retain the member in the slot.

According to this embodiment, during at least one of the step (c) and the step (d) the member may be retained in the slot by a press-fit.

According to this embodiment, the slot may be of a closed configuration and defines a first upper slot width at an upper open end thereof which is less than a second lower slot width at a lower closed bottom end thereof, wherein the metal strip is a generally flat metal strip prior to assembly and during at least one of the step (c) and the step (d) the metal strip may be permanently deformed to a generally U-shaped strip to retain the member in the slot.

According to this embodiment, the slot may be of a closed configuration and defines a first upper slot width at an upper open end thereof which is less than a second lower slot width at a lower closed bottom end thereof, wherein the metal strip is a generally U-shaped metal strip prior to assembly and during the at least one of the step (c) and the step (d) the metal strip may be permanently deformed to also a generally U-shaped metal strip to retain the member in the slot.

According to this embodiment, the slot may be of a closed configuration and defines a first upper slot width at an upper open end thereof which is less than a second lower slot width at a lower closed bottom end thereof, wherein the metal strip is a generally bow-shaped metal strip prior to assembly and during the step (d) the metal strip may be non-permanently deformed to retain the member in the slot.

Other advantages of this invention will become apparent to those skilled in the art from the following detailed description of the invention, when read in light of the accompanying drawings.

DETAILED DESCRIPTION OF THE PREFERRED EMBODIMENTS

Figure 1:
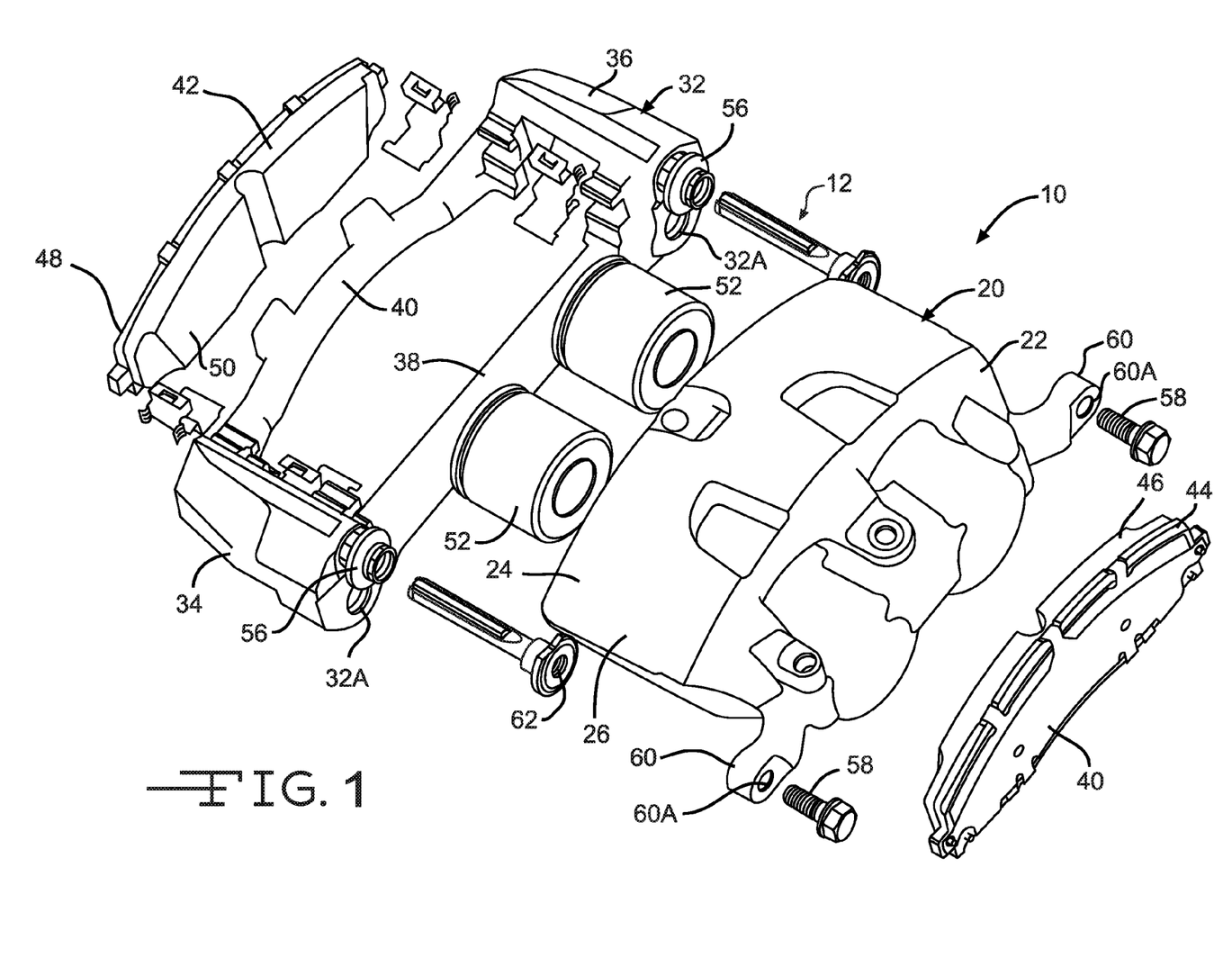
FIG. 1 is an exploded perspective view of a portion of an embodiment of a vehicle disc brake assembly, including a first embodiment of a guide pin, constructed in accordance with the present invention.

Referring now to FIG. 1, there is illustrated a portion of a vehicle disc brake assembly, indicated generally at 10, including an embodiment of a guide pin, indicated generally at 12, in accordance with the present invention. The general structure and operation of the prior art disc brake assembly 10 is conventional in the art. Thus, only those portions of the prior art disc brake assembly 10 which are necessary for a full understanding of this invention will be explained and illustrated. Also, although this invention will be described and illustrated in connection with the particular disc brake assembly 10 disclosed herein, it will be appreciated that this invention may be used in connection with other types or kinds of disc brake assemblies, such as for example, as generally shown in U.S. Pat. No. 8,051,958 to Rockwell et al., U.S. Pat. No. 6,039,156 to Schneider, and U.S. Pat. No. 5,927,446 to Evans, the disclosures of each of these patents incorporated herein by reference in their entirety, and/or in connection with other types of kinds of "pin guided" or "pin sliding" disc brake assemblies, if so desired.

As shown in the illustrated embodiment of FIG. 1, the disc brake assembly 10 is a pin guided or pin sliding type of disc brake assembly and includes a generally C-shaped caliper, indicated generally at 20. The caliper 20 includes an inboard leg portion 22 and an outboard leg portion 24 which are interconnected by an intermediate bridge portion 26. The caliper 20 is slidably supported on a pair of the guide pins 12 which are secured to an anchor bracket, indicated generally at 32. The anchor bracket 32 is, in turn, secured to a stationary component of the vehicle by suitable fasteners, such as for example bolts (not shown), which extend through openings 32A provided in the anchor bracket 32. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

In the illustrated embodiment, the anchor bracket 32 includes a pair of axially and outwardly extending arms 34 and 36 which are interconnected at their inboard ends by an inner tie bar 38 and which are interconnected at their outboard ends by an outer tie bar 40. The arms 34 and 36 each have a pair of generally C-shaped channels 38 formed thereon. The channels 38 are provided to slidably support an inboard brake shoe, indicated generally at 40, and an outboard brake shoe, indicated generally at 42, thereon. Alternatively, the construction and/or configuration of the anchor bracket 32 may be other than illustrated and described if so desired.

In the illustrated embodiment, the inboard brake shoe 40 includes a backing plate 44 and a friction pad 46. The inboard backing plate 44 includes opposed ends having tabs or protrusions 44A formed thereon, for supporting the inboard brake shoe 40 in the channels 38 of the anchor bracket 32. The outboard brake shoe 42 includes a backing plate 48 and a friction pad 50. The outboard backing plate 48 includes opposed ends having tabs or protrusions 48A formed thereon, for supporting the outboard brake shoe 32 in the channels 38 of the anchor bracket 32. Alternatively, the construction and/or supporting of one or both of the brake shoes 40 and 42 may be other than illustrated and described if so desired. For example, the inboard brake shoe 40 can be supported on a brake piston/pistons 52 of the disc brake assembly 10, and/or the outboard brake shoe 42 can be supported on the outboard leg portion 24 of the caliper 20.

In the illustrated embodiment, an actuation means (not shown) is provided for effecting the operation of the disc brake assembly 10. In the illustrated embodiment, the actuation means includes the pair of brake pistons 52 each of which is disposed in a counterbore or recess (not shown), formed in an outboard surface of the inboard leg 22 of the caliper 20. The actuation means can be hydraulic, electrical, pneumatic, and mechanical types.

Figure 2:
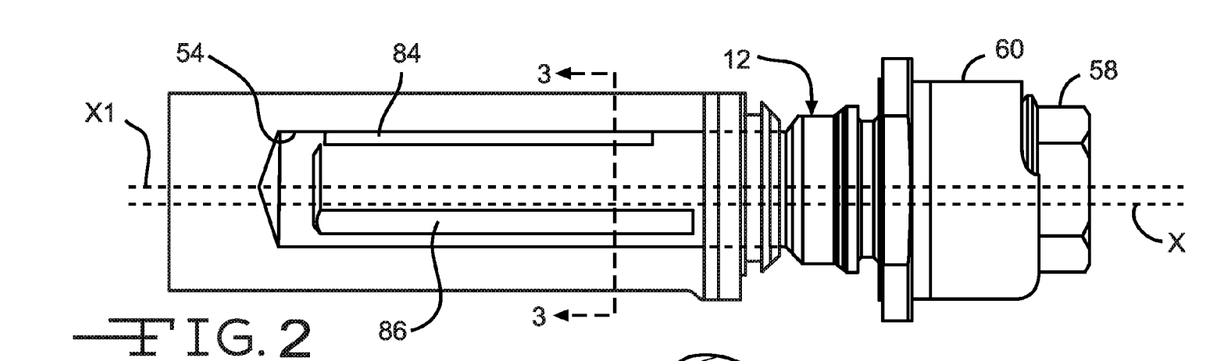
FIG. 2 is a view of a portion of the vehicle disc brake assembly illustrated in FIG. 1.
Figure 5:
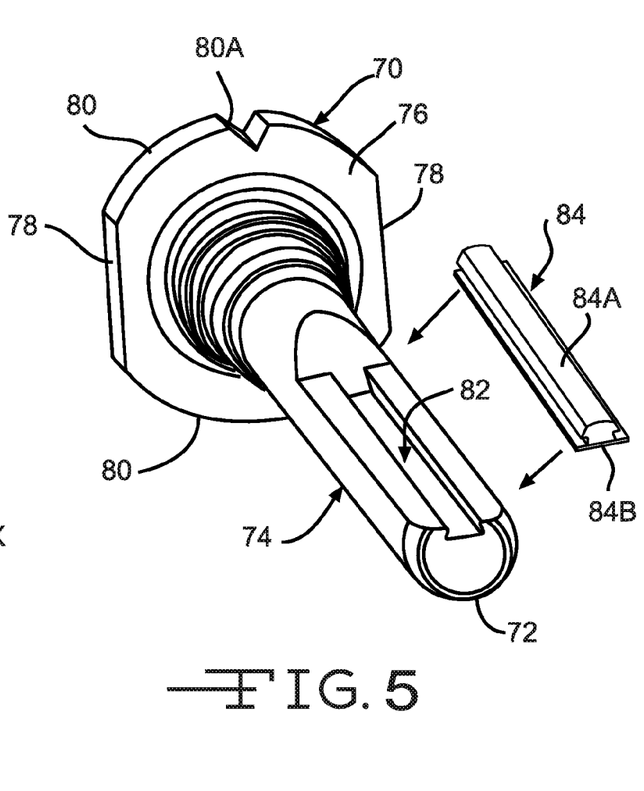

As shown in FIG. 1, each of the guide pins 12, which will be discussed below in detail, is disposed in a non-threaded bore 54 (shown in FIGS. 2 and 3), provided in each of the arms 34 and 36 of the anchor bracket 32. A boot seal 56 is preferably installed in each of the openings 54 through which each of the guide pins 12 extend. A pair of threaded fasteners 58 are provided to slidably secure the caliper 20 to the anchor bracket 32. The fasteners 58 extend through openings 60A provided in lugs or ears 60 of the caliper 20 and are installed in an internally threaded bore 62 (shown in FIG. 5), provided in each guide pin 12.

Turning now to FIGS. 2-6, the construction of the first embodiment of the guide pin 12 will be discussed in detail. In the illustrated embodiment, each of the guide pins 12 is preferably identical to one another and includes a first end, indicated generally at 70, which defines a head portion. The guide pin 12 further includes a second end, indicated generally at 72, which defines a lead-in portion, and a center section, indicated generally at 74, which defines a shank portion.

In the illustrated embodiment, the head 70 preferably includes the internally threaded bore 62 (shown in FIG. 1), provided therein. The head 70 preferably further includes a flange 76 having a pair of opposed planar or flat surfaces 78 provided thereon and a pair of arcuate surfaces 80 disposed between the opposed flat surfaces 78. In the illustrated embodiment, one of the arcuate surfaces 80 preferably includes an indicia or other suitable identifying feature 80A provided therein or thereon for a purpose to be discussed below. In the illustrated embodiment, the indicia 80A is a V-shaped notch provided in one of the arcuate surfaces 80. Alternatively, the construction and/or configuration of the head 70 may be other than illustrated and described if so desired. For example, the head 70 would not have the internally threaded bore if stud type guide pins are used.

In the illustrated embodiment, the shank portion 74 of the guide pin 12 is annular, defines a first axis Y and a second axis X, and preferably includes a slot or recess 82 provided therein along at least a portion thereof. Preferably, as illustrated, the slot 82 and the indicia 80A are in alignment with one another so that the orientation of the guide pin 12 in the bore 54 of the caliper 12 can be set to a desired predetermined orientation therewithin. The slot 82 is configured to receive a "spring-like" bushing or member 84 therein for a purpose to be discussed below.

Figure 4:
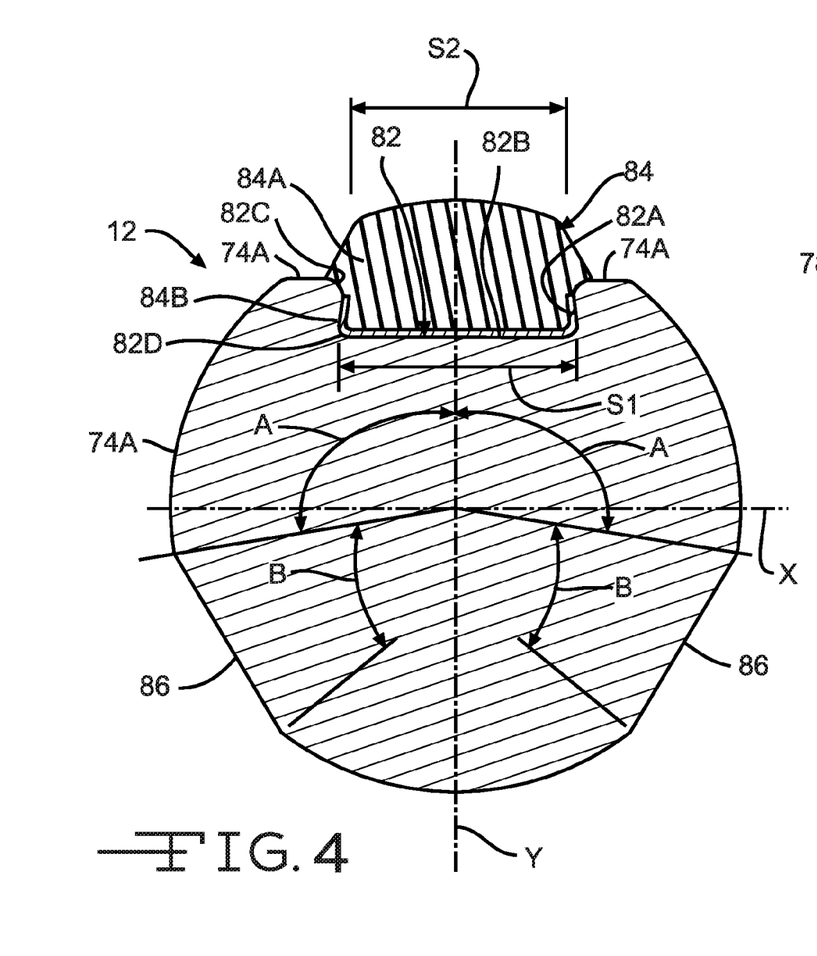
FIGS. 4-6 are selected views of the first embodiment of the guide pin illustrated in FIGS. 1-3.

To assist in this, in the illustrated embodiment the slot 82 is preferably formed as a "closed" slot and defines a first or lower slot width or dimension S1 at a lower closed bottom end thereof and a second or upper slot width or dimension S2 at an upper open end thereof which is less then the first slot width S1 such that side walls 82A of the slot 82 are tapered slightly inwardly toward a bottom wall 82B thereof. Also, as best shown in FIG. 4, selected portions of the slot 82 may be generally rounded or curved, such as shown at 82C and 82D.

In the illustrated embodiment, the member 84 includes a first member 84A and a second member 84B. In the illustrated embodiment, the first member 84A is preferably formed from an elastomeric or rubber material and the second member 84B is preferably formed from a metal material. The first member 84A may be attached or secured to the second member 84B by suitable mechanical and/or chemical means, such as for example by molding, gluing and/or vulcanizing. In the illustrated embodiment the first member 84A may be preferably secured to the second member 84B by vulcanization.

Figure 6:
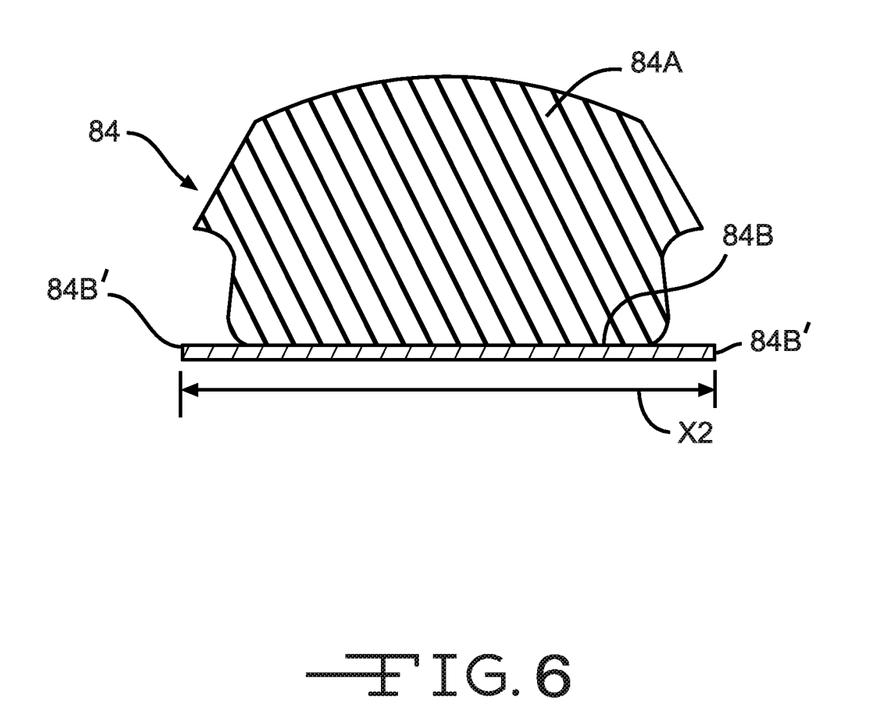

As shown in FIG. 6, in the uninstalled state, the second member 84B which is formed as a generally flat plate or strip and defines a width or dimension X2. Preferably, the width X2 of the second member 84B is at least slightly greater than the second slot width S2 of the slot 82. As a result of this, when the member 84 is installed in the slot 82 of the guide pin 12, opposed portion or sides 84B' of the second member 84B will first engage the second slot S2 and deform the second member 84B inwardly against the adjacent surface of the first member 84A. Following this, the member 84 is then moved downwardly in the slot 82 to the installed position as shown in FIG. 4.

In this position, the second member 84B will generally conform to an outer shape or profile of the first member 84A. This results in the member 84 being installed and retained in the slot 82 of the guide pin 12, prior to installation of the guide pin 12 in the bore 54 of the anchor bracket 32, by at least a mechanical press-fit or friction fit of at least one of the contact between the metal surfaces of the slot 82 and the second member 84B and/or the contact between the rubber surface of the first member 84A and the metal surface of the slot 82. However, in both cases, the member 84 is retained in the slot 82 by the mechanical press-fit or friction fit between contacting surfaces of the components. As can be understood, the particular press-fit which is achieved will depend upon the particular geometries and/or construction of the slot 82 and/or the first member 84A and/or the second member 84B, and also will depend upon the amount of force or pressure which is exerted on the member 84, in particular the first member 84A, during the installation process of the member 84 in the slot 82.

Furthermore, when the guide pin 12 is then installed in the bore 54 of the anchor bracket 32, as shown in FIG. 4, the first member 84A may be further deformed and compressed causing the rubber material thereof to be expanded or moved outwardly. As a result of this further compression, the rubber material of the first member 84A will further and permanently fully deform (i.e., if not fully deformed during the installation of the member 84 in the slot 82 of the pin 12), the metal material of the second member 84B causing it to move or expand outwardly within the slot 82 so as to generally conform to an outer shape or profile of the slot 82, which preferably is of a closed configuration, thereby positively locking or capturing the member 84 in the slot 82.

Alternatively, this positive lock of the second member 84B in the slot 82 by permanently and fully deforming the second member 84B in the slot 82 may be accomplished during the initial assembly of the member 84 in the slot 82 of the guide pin 12. This can be done by applying a sufficient amount of force to the first member 84A during assembly so as to also cause the metal material of the second member 84B to expand outwardly within the slot 82 so as to permanently and fully deform and generally conform to the outer shape or profile of the slot 82 thereby positively locking the member 84 in the slot 82 prior to its installation in the bore 54. Also, as shown in FIG. 4, when the member 84 is secured to the guide pin 12 a portion of a first member 84A of the member 84 extends outwardly from the slot 82 beyond an outer surface 74A of the shank portion 74 of the guide pin 12 for a purpose to be discussed below.

In the illustrated embodiment, the guide pin 12 preferably further includes a pair of "lateral flat" surfaces or features 86 provided thereon. In the illustrated embodiment, the flat surfaces 86 are preferably formed so as to extend from near the second end 72 and toward the first end 70 so as to be provided in a substantial portion of the shank portion 74 of the guide pin 12. Preferably, as shown in the illustrated embodiment, the flat surfaces 86 are each spaced at a same angle A relative to the first axis Y of the guide pin 12 (which axis Y is also a center axis of the slot 82), and each flat surface 86 extends a predetermined angular distance B.

Figure 7:
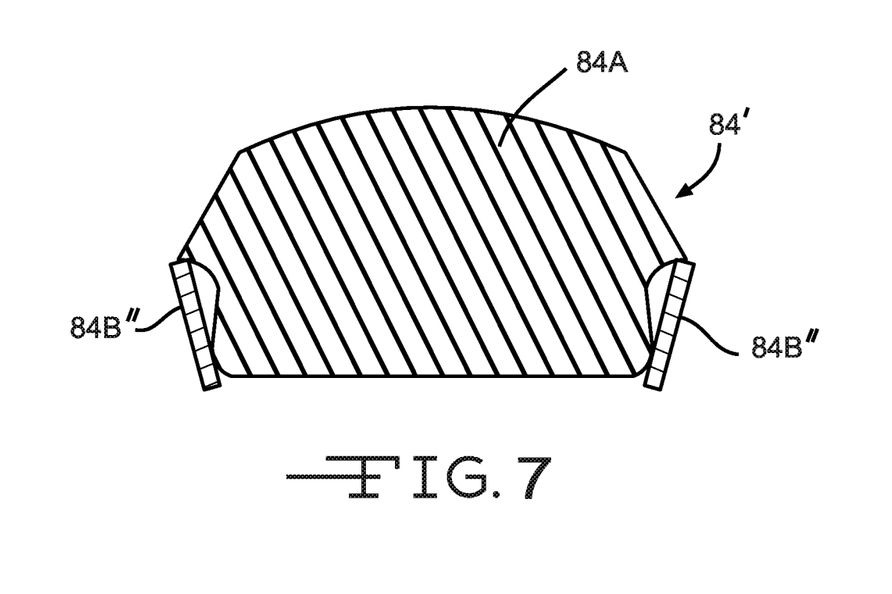
FIG. 7 is a view similar to FIG. 6 showing a second embodiment of a guide pin constructed in accordance with the present invention and prior to installation.
Figure 8:
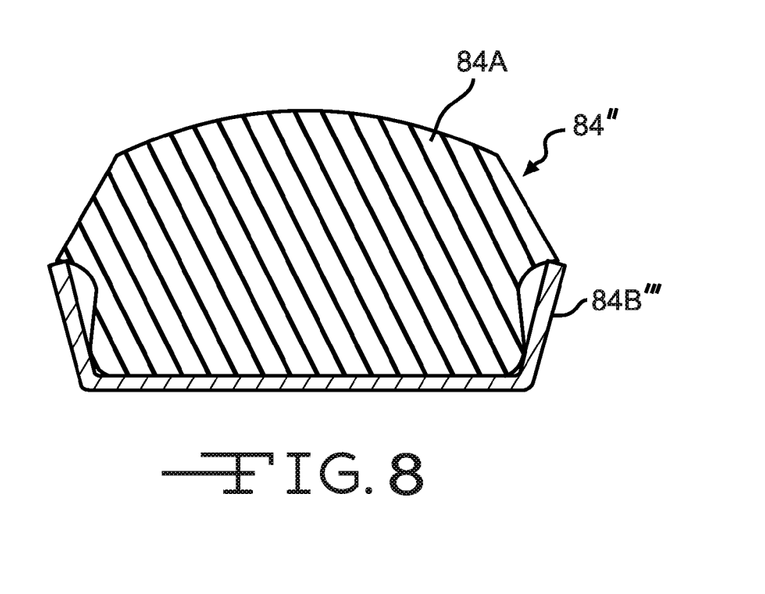
FIG. 8 is a view similar to FIG. 6 showing a third embodiment of a guide pin constructed in accordance with the present invention and prior to installation.
Figure 9:
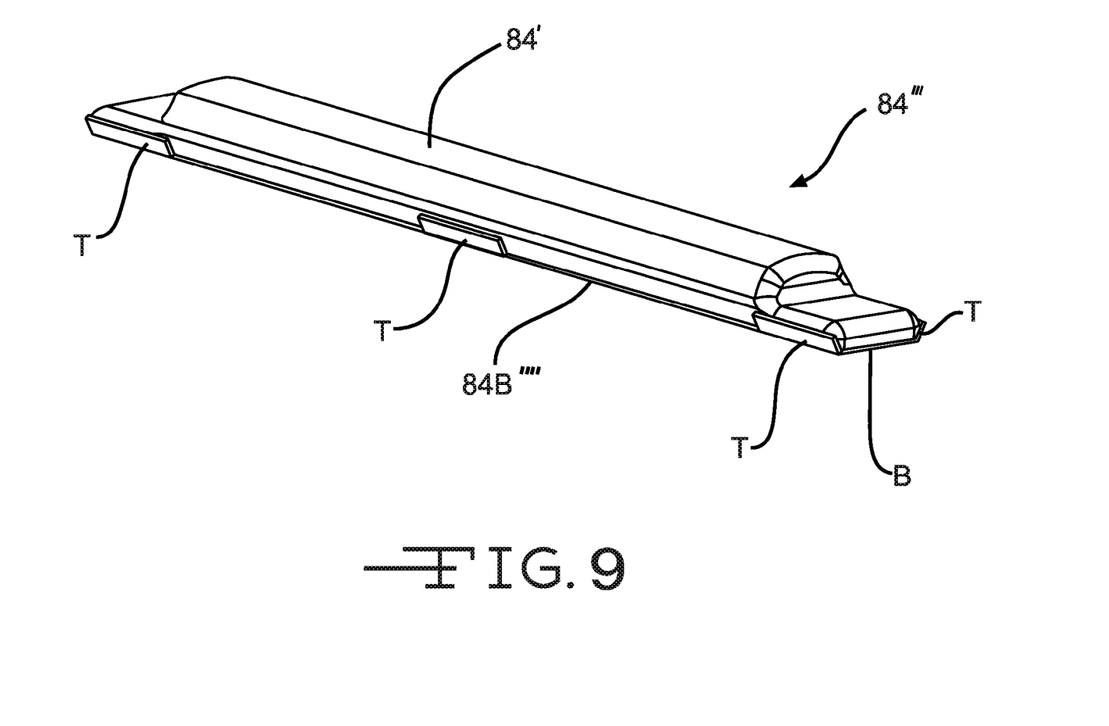
FIG. 9 is a perspective view showing a fourth embodiment of a guide pin constructed in accordance with the present invention and prior to installation.

Alternatively, the construction of the guide pin 12 may be other than illustrated and described if so desired. For example, the configuration, number, location and/or orientation of one or more of the first end 70, the second end 72, the shank portion 74, the slot 82, the flat surfaces 86, and/or the angles A and/or B may be other than illustrated and described if so desired. For example, as illustrated in FIG. 7, a member 84' can include a pair of second members 84B" along the sides of the first member 84A as shown therein. Also, as illustrated in FIG. 8, a member 84" can include a generally U-shaped second member 84B"" along a bottom and sides of the first member 84A, as shown therein. Further, as illustrated in FIG. 9, a member 84''' can be provided having a first member 84A''' and a second member 84B"". In this embodiment, the second member 84B"" is generally at least partially U-shaped and includes a plurality of spaced apart "angled" tabs T extending from a main or bottom wall or portion B thereof. In all of these alternate embodiments, the installation, function and operation of the associated members 84', 84" and 84''' would be generally similar to or the same as that of the member 84 described and illustrated herein.

Figure 3:
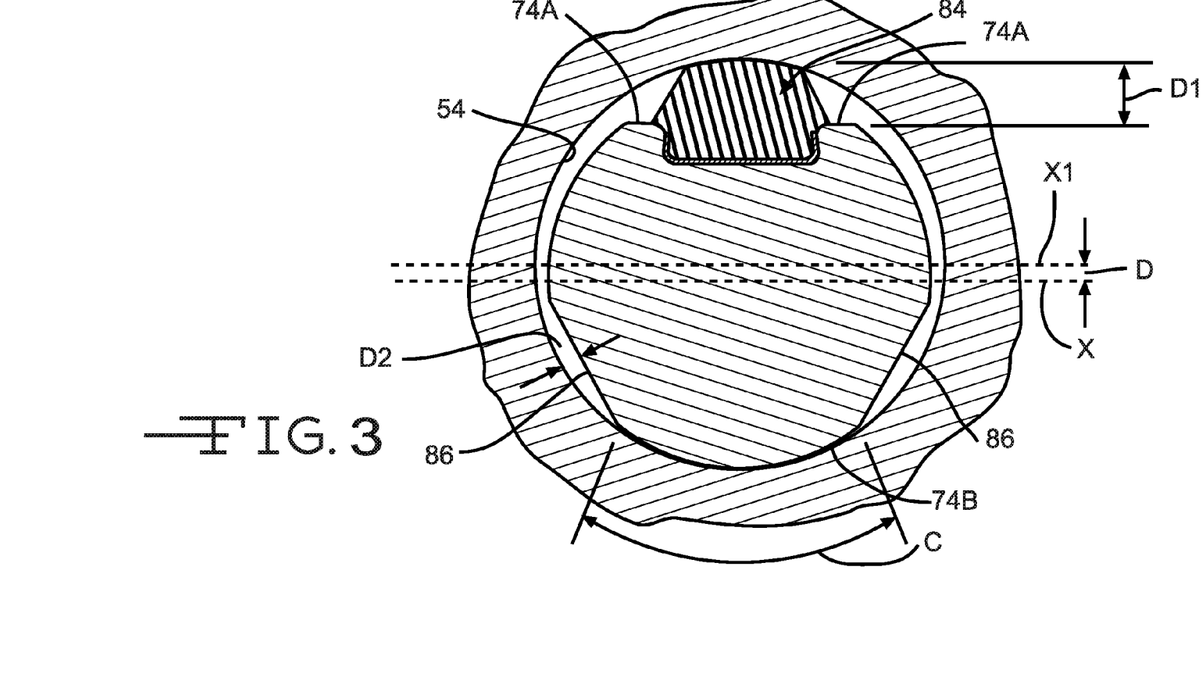
FIG. 3 is a sectional view taken along line 3-3 of FIG. 2.

As best shown in FIG. 3, when the disc brake assembly is fully assembled and the guide pin 12 is in the installed normal position, the member 84 is configured to engage only a portion of the bore 54 and to be compressed within the bore 54 so as to be operative to offset the axis X of the guide pin 12 relative to an axis X1 of the bore 54 a distance D. In the illustrated embodiment, the distance D is preferably in the range from about 0.05 mm to about 0.15 mm.

At the same time, the member 84 is operative to bias—in a spring-like manner—only a portion 74B of an outer surface of the shank portion 74 of the guide pin 12 in "defined" contact with the bore 54. As used herein, the term "defined contact" or "defined point of contact" means a defined point, line or area of contact defined between the portion 74B of the shank portion 74 and a portion of the bore 54. In the illustrated embodiment, the defined contact between the portion 74B and the bore 54 extends an angular distance C. The angular distance C is preferably in the range from about 1-2 degrees to about 88-89 degrees. More preferably, the range is from about 15 degrees to about 60 degrees. Even more preferably the range is from about 30 degrees to about 45 degrees.

For example, the member 84 may be formed from other materials so long as the material is operative to provide a spring-like or similar biasing feature to that of the rubber material. Also, more than one member 84 can be provided and/or more than one defined points of contact can be provided between the associated surfaces of the guide pin and the bore. Thus, as can be readily understood, there are many different configurations possible having at least one or more of such members M and one or more of such defined points of contact C. Also, as can be readily understood, the present invention can be used in connection with other attachment styles of guide pins if so desired.

Also, as can be seen in FIG. 3, the member 84 is operative to provide a first or "radial" guide pin clearance D1 between the bore 54 and the outer surface 74A of the shank portion 74 of the guide pin 12. The clearance D1 is preferably in the range from about 0.10 mm to about 0.30 mm. Further, a second or "tangential" guide clearance D2 is provided between the flat surfaces 86 of the shank portion 74 of the guide pin 12 and the bore 54.

Alternatively, the construction of the guide pin 12 and/or associated parts of the disc brake assembly 10 may be other than illustrated and described if so desired. For example, the configuration, number, location and/or orientation of one or more of the first end 70, the second end 72, the shank portion 74, the recess 82, the flat surfaces 86, the angles A, B and/or C, and/or the distances D, D1 and/or D2 may be other than illustrated and described, if so desired.

Figure 10:
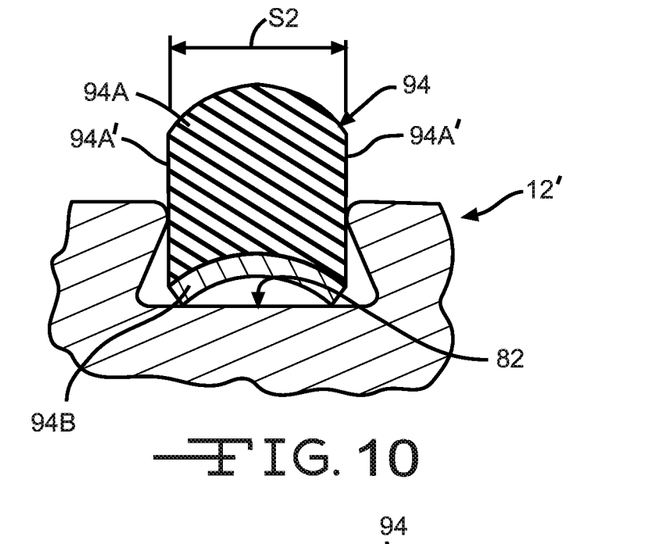
FIG. 10 is a view similar to FIG. 6 showing a fifth embodiment of a guide pin constructed in accordance with the present invention and prior to installation.
Figures 11, 12:
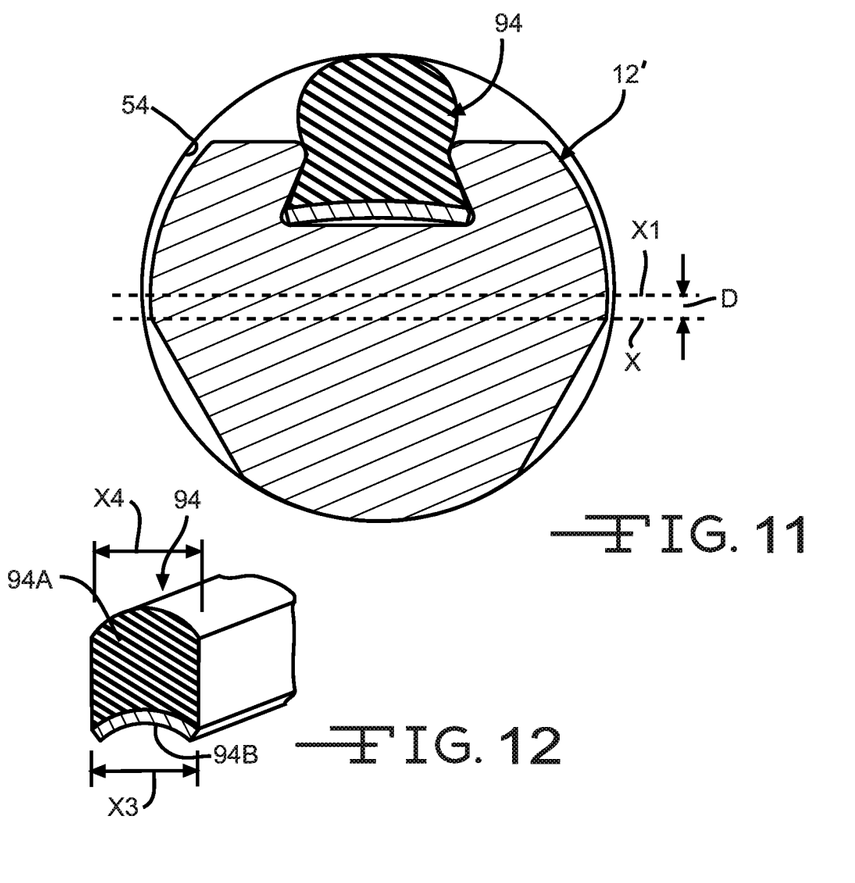
FIG. 11 is a view of the fifth embodiment of the guide pin showing the guide pin in an installed position in a portion of an associated vehicle disc brake assembly.
FIG. 12 is a view of a portion of the fifth embodiment of the guide pin shown in FIGS. 10 and 11.

Turning now to FIGS. 10-12 and using like reference numbers to indicate corresponding or similar parts, there is illustrated a second embodiment of a guide pin, illustrated generally at 12'. This embodiment is similar to that shown and described above in connection with the first embodiment of the guide pin except that in this embodiment a member 94 is provided having a different configuration or construction compared to that of the member 84 of the first guide pin embodiment As shown herein, the member 94 includes a first member 94A and a second member 94B. In the illustrated embodiment, the first member 94A is preferably formed from an elastomeric or rubber material and the second member 94B is preferably formed from a metal material. The first member 94A may be attached or secured to the second member 94B by suitable mechanical and/or chemical means, such as for example by molding, gluing and/or vulcanizing. In the illustrated embodiment the first member 94A may be preferably secured to the second member 94B by vulcanization.

As shown in FIG. 12, in this embodiment in the uninstalled state, the second member 94B is formed as a generally flat "bowed" outwardly or concave shaped plate or strip and defines a "normal" width or dimension X3. Preferably, the width X3 of the second member 94B is preferably slightly less than or generally equal to the second slot width S2 of the slot 82 for initial installation purposes. Also, preferably the side walls of the first member 94A define a width or dimension X4 which is preferably slightly greater than or generally equal to the second slot width S2 for initial retention purposes.

As a result of this, when the member 94 is initially installed in the slot 82 of the guide pin 12, as shown in FIG. 10, opposed sides 94A' of the first member 94A will engage the associated walls of the slot 82 at the second slot width S2 thereof. This results in the member 94 being installed and retained in the slot 82 of the guide pin 12', prior to installation of the guide pin 12' in the bore 54 of the anchor bracket 32, by a first or "light" mechanical press-fit or friction fit due to the contact between at least the rubber surface of the first member 94A with the metal surface of the slot 82.

Furthermore, when the guide pin 12' is then installed in the bore 54 of the anchor bracket 32, as shown in FIG. 11, the first member 94A is deformed and compressed causing the rubber material thereof to be expanded or moved outwardly. As a result of this compression, the rubber material of the first member 94A will cause the second member 94B to deflect or to be biased inwardly causing it to non-permanently flatten or spread out within the slot 82, which preferably is of a closed configuration as described above, thereby positively locking or capturing the member 94 in the slot 82 of the guide pin 12'. Once installed, the installation, function and operation of the guide pin 12' having the member 94 would be similar or the same as that of the guide pin 12 having the member 84 described and illustrated herein; however, in this embodiment, since the second member 94B does not permanently deform the second member 94B may provide an additional advantage of providing a "biasing" mechanism or means to compensate for any loss of the material of the first member 94A caused by wear thereof during sliding in the bore 54 compared to that of the prior embodiments wherein the associated second members 84B, 84B' and 84B" permanently deform during the assembly to the associated guide pin itself or during the assembly of the guide pin in the bore 54 of the anchor bracket 32.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:
    an anchor bracket having at least one bore formed therein, the bore defining a first axis; and
    a guide pin adapted to be disposed in the bore of the anchor bracket and configured to slidably support a brake caliper relative to the anchor bracket, the guide pin defining a second axis;
    wherein when the guide pin is disposed in the at least one bore of the anchor bracket, the second axis of the guide pin is configured to be continually offset relative to the first axis of the at least one bore such that there is provided at least one defined point of contact between only a portion of the guide pin and a portion of an inner surface of the at least one bore;
    wherein the guide pin includes at least one slot of a closed configuration and defines a first upper slot width at an upper open end thereof which is less than a second lower slot width at a lower closed bottom end thereof, the at least one slot has a member, which is formed separate from the guide pin, disposed therein and which member only, when disposed in contact against an inner diameter of the at least one bore, is operative to continually bias the guide pin in the at least one bore thereby offsetting the second axis of the guide pin relative to the first axis of the at least one bore, wherein the member includes a first member formed from an elastomeric material and a second member formed from a metal material, and wherein the second member is configured to be fixedly retained in the at least one slot so that the second member by itself is configured to retain the first member in the at least one slot.

2. The disc brake assembly of claim 1 wherein the second member is retained in the at least one slot by a press-fit.

3. The disc brake assembly of claim 1 wherein the second member is at least one metal strip.

4. The disc brake assembly of claim 3 wherein the metal strip is a generally flat metal strip.

5. The disc brake assembly of claim 3 wherein the metal strip is a generally U-shaped metal strip.

6. The disc brake assembly of claim 3 wherein the metal strip is a generally bow-shaped metal strip.

7. The disc brake assembly of claim 1 wherein the second member is a pair of metal strips disposed on opposed sides of the first member.

8. A disc brake assembly comprising:
    an anchor bracket having at least one bore formed therein, the bore defining a first axis; and
    a guide pin adapted to be disposed in the bore of the anchor bracket and configured to slidably support a brake caliper relative to the anchor bracket, the guide pin defining a second axis;
    wherein when the guide pin is disposed in the at least one bore of the anchor bracket, the second axis of the guide pin is configured to be offset relative to the first axis of the at least one bore such that there is provided at least one defined point of contact between only a portion of a shank portion of the guide pin and a portion of an inner surface of the at least one bore;
    wherein the guide pin includes at least one slot of a closed configuration and defines a first upper slot width at an upper open end thereof which is less than a second lower slot width at a lower closed bottom end thereof, the at least one slot having a member, which is formed separate from the guide pin, disposed therein and which is operative to bias the guide pin in the at least one bore thereby offsetting the second axis of the guide pin relative to the first axis of the at least one bore, wherein the member includes at least one first member formed from an elastomeric material and at least one second member formed from a metal material, wherein the at least one second member is secured to the at least one first member and the at least one second member is configured to deform to retain the at least one second member in the at least one slot such that the at least one second member by itself retains the first member in the at least one slot.

9. The disc brake assembly of claim 8 wherein the at least one second member is retained in the at least one slot by a press-fit.

10. The disc brake assembly of claim 8 wherein the at least one second member is a generally flat metal strip.

11. The disc brake assembly of claim 8 wherein the at least one second member is a generally U-shaped metal strip.

12. The disc brake assembly of claim 8 wherein the at least one second member is a generally bow-shaped metal strip.

13. The disc brake assembly of claim 8 wherein the at least one second member is a pair of metal strips disposed on opposed sides of the first member.

14. A method for producing a disc brake assembly comprising the steps of:
    (a) providing an anchor bracket having at least one bore formed therein, the bore defining a first axis;
    (b) providing a guide pin having at least one slot formed therein, the guide pin defining a second axis;
    (c) disposing a member, which is formed separate from the guide pin, in the at least one slot, the member including a first member formed from an elastomeric material and a second member formed from a metal material;

(d) following step (c), disposing the guide pin in the at least one bore of the anchor bracket wherein the first member is operative to continually bias the guide pin in the at least one bore to thereby offset the second axis of the guide pin relative to the first axis of the at least one bore such that there is provided at least one defined point of contact between only a portion of the guide pin and a portion of an inner surface of the at least one bore, and wherein during at least one of the step (c) and the step (d) the second member is configured to deform to retain the at least one second member in the at least one slot such that the second member by itself retains the first member in the at least one slot.

15. The method of claim 14 wherein during at least one of the step (c) and the step (d) the second member is retained in the at least one slot by a press-fit.

16. A method for producing a disc brake assembly comprising the steps of:
   (a) providing an anchor bracket having at least one bore formed therein, the bore defining a first axis;
   (b) providing a guide pin having at least one slot formed therein, the guide pin defining a second axis;
   (c) disposing a member, which is formed separate from the guide pin, in the at least one slot, the member including a first member formed from an elastomeric material and a second member formed from a metal strip;
   (d) following step (c), disposing the guide pin in the at least one bore of the anchor bracket wherein the first member is operative to bias the guide pin in the at least one bore to thereby offset the second axis of the guide pin relative to the first axis of the at least one bore such that there is provided at least one defined point of contact between only a portion of the guide pin and a portion of an inner surface of the at least one bore, and wherein during at least one of the step (c) and the step (d) the second member is configured to deform to retain the second member in the at least one slot and thereby retain the first member in the at least one slot,
   wherein the at least one slot is of a closed configuration and defines a first upper slot width at an upper open end thereof which is less than a second lower slot width at a lower closed bottom end thereof, wherein the metal strip is a generally flat metal strip prior to assembly and during at least one of the step (c) and the step (d) the metal strip is permanently deformed to a generally U-shaped strip to retain the first member in the at least one slot.

17. A method for producing a disc brake assembly comprising the steps of:
   (a) providing an anchor bracket having at least one bore formed therein, the bore defining a first axis;
   (b) providing a guide pin having at least one slot formed therein, the guide pin defining a second axis;
   (c) disposing a member, which is formed separate from the guide pin, in the at least one slot, the member including a first member formed from an elastomeric material and a second member formed from a metal strip;
   (d) following step (c), disposing the guide pin in the at least one bore of the anchor bracket wherein the first member is operative to bias the guide pin in the at least one bore to thereby offset the second axis of the guide pin relative to the first axis of the at least one bore such that there is provided at least one defined point of contact between only a portion of the guide pin and a portion of an inner surface of the at least one bore, and wherein during at least one of the step (c) and the step (d) the second member is configured to deform to retain the second member in the at least one slot and thereby retain the first member in the at least one slot,
   wherein the at least one slot is of a closed configuration and defines a first upper slot width at an upper open end thereof which is less than a second lower slot width at a lower closed bottom end thereof, wherein the metal strip is a generally U-shaped metal strip prior to assembly and during the at least one of the step (c) and the step (d) the metal strip is permanently deformed to also a generally U-shaped metal strip to retain the first member in the at least one slot.

18. A method for producing a disc brake assembly comprising the steps of:
   (a) providing an anchor bracket having at least one bore formed therein, the bore defining a first axis;
   (b) providing a guide pin having at least one slot formed therein, the guide pin defining a second axis;
   (c) disposing a member, which is formed separate from the guide pin, in the at least one slot, the member including a first member formed from an elastomeric material and a second member formed from a metal strip;
   (d) following step (c), disposing the guide pin in the at least one bore of the anchor bracket wherein the first member is operative to bias the guide pin in the at least one bore to thereby offset the second axis of the guide pin relative to the first axis of the at least one bore such that there is provided at least one defined point of contact between only a portion of the guide pin and a portion of an inner surface of the at least one bore, and wherein during at least one of the step (c) and the step (d) the second member is configured to deform to retain the second member in the at least one slot and thereby retain the first member in the at least one slot,
   wherein the at least one slot is of a closed configuration and defines a first upper slot width at an upper open end thereof which is less than a second lower slot width at a lower closed bottom end thereof, wherein the metal strip is a generally bow-shaped metal strip prior to assembly and during the step (d) the metal strip is non-permanently deformed to retain the first member in the at least one slot.

* * * * *